United States Patent [19]

Coppa et al.

[11] 3,773,275

[45] Nov. 20, 1973

[54] REEL CONTROL FOR A TAPE TRANSPORT SYSTEM

[75] Inventors: Paul L. Coppa; John J. Marchesani, both of Morristown; Louis G. Orsatti, Philadelphia, all of Pa.

[73] Assignee: Mohawk Data Sciences Corporation, Herkimer, N.Y.

[22] Filed: July 22, 1971

[21] Appl. No.: 165,247

[52] U.S. Cl. .................................... 242/184

[51] Int. Cl. .................................... G11b 15/58

[58] Field of Search .................... 242/182, 183, 184, 242/185; 226/95, 97, 118

[56] References Cited

UNITED STATES PATENTS

| | | | |
|---|---|---|---|
| 3,370,802 | 2/1968 | Wooldridge et al. | 242/184 |
| 3,203,635 | 8/1965 | Rayfield | 242/184 |
| 3,471,103 | 10/1969 | Gabor | 242/184 |
| 3,550,878 | 12/1970 | Crisp et al. | 242/184 |
| 3,648,134 | 3/1972 | Audeh et al. | 242/184 UX R |

*Primary Examiner*—George F. Mautz
*Assistant Examiner*—John M. Jillions
*Attorney*—Francis L. Thomas et al.

[57] ABSTRACT

The tape transport described has a supply reel, a motor for bidirectionally driving the supply reel, a takeup reel, a motor for bidirectionally driving the takeup reel, a capstan located between the supply and takeup reels for feeding the tape, a supply loop box for buffering the tape between the supply reel and capstan, and a takeup loop box for buffering the tape between the capstan and takeup reel. The reels are bidirectionally driven by their respective motors in response to the amount of tape in their associated loop boxes. Each loop box is divided into four zones so that the position of the end of the loop therein corresponds to four successively increasing predetermined amounts of tape. In response to the lowest and first predetermined amount of tape in the supply loop box, the supply reel is rotated to payout tape; in response to a second greater amount of tape occurring in the box, the supply reel is intermittently driven to payout tape. In response to a third amount of tape in the box, the supply reel is allowed to freely rotate and in response to the fourth and maximum amount of tape in the loop box, the supply reel is rotated to takeup the tape. With respect to the takeup reel, the lowest and first predetermined amount of tape in its respective loop box causes the takeup reel to payout tape. When a second and greater amount of tape is sensed, the takeup reel is allowed to freely rotate. In response to sensing a third amount of tape, the takeup reel is intermittently driven to take up tape. In response to the fourth and maximum predetermined amount of tape, the takeup reel is driven to takeup the tape. The transport is bidirectional so that when the tape is being moved backwards the supply reel is controlled as the takeup reel and the takeup reel as the supply reel. When the capstan is not feeding tape in either direction, the amount of tape in each loop is regulated in a manner similar to the way in which the takeup reel is controlled during normal forward tape feeding.

7 Claims, 11 Drawing Figures

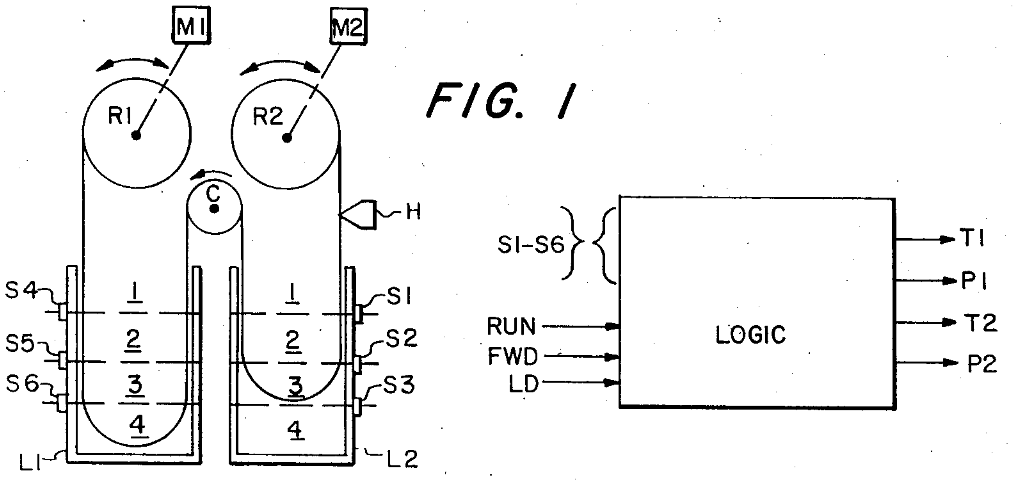
FIG. 1
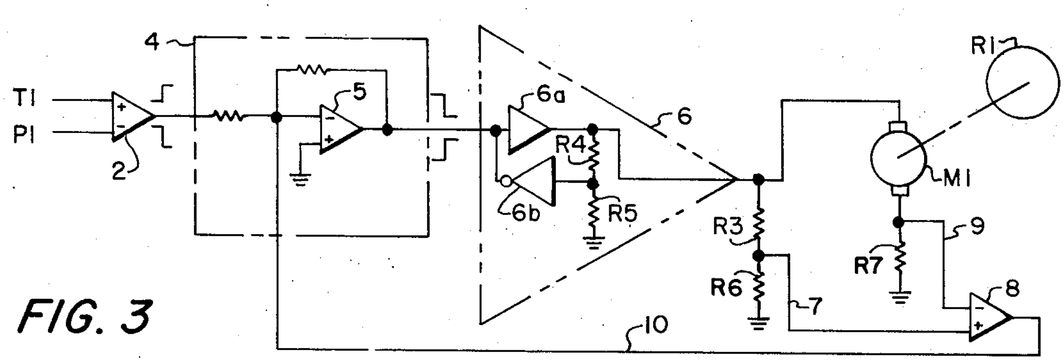
FIG. 3
| LOOP END LOCATION | TAKE UP REEL R1 | SUPPLY REEL R2 |
|---|---|---|
| 1 | PAYOUT | PAYOUT |
| 2 | COAST | CHOP PAYOUT |
| 3 | CHOP TAKE UP | COAST |
| 4 | TAKE UP | TAKE UP |
FIG. 4
| LOOP END LOCATION | TAKE UP REEL R1 | SUPPLY REEL R2 |
|---|---|---|
| 1 | PAYOUT | PAYOUT |
| 2 | COAST | COAST |
| 3 | CHOP TAKE UP | CHOP TAKE UP |
| 4 | TAKE UP | TAKE UP |
FIG. 5
INVENTORS
PAUL L. COPPA
JOHN J. MARCHESANI
LOUIS G. ORSATTI
BY Thomas C. Siekman
ATTORNEY

PATENTED NOV 20 1973 3,773,275

SHEET 2 OF 5

REEL CONTROL FOR A TAPE TRANSPORT SYSTEM

BACKGROUND OF THE INVENTION

In magnetic tape transport systems, the tape may commonly be driven from a supply reel past a read and/or write magnetic head to a takeup reel by frictional engagement around the periphery of a capstan located between the two reels. The capstan may be bidirectionally driven so that in feeding the tape backward in the opposite direction the supply reel becomes the takeup reel with the takeup reel becoming the supply reel. Since magnetic tape is thin and flexible, care must be given to insure that the tape when being fed is not subjected to excessive longitudinal stresses between the reels and capstan which might cause undue tape wear or breakage. To avoid this problem, a buffer is generally arranged between each reel and the capstan. Commonly, each of these buffers is an elongated "loop" box which contains a loop of the tape. The tape is drawn into each loop box by a vacuum. To avoid excessive tape in the loop boxes yet maintain an amount therein sufficient for buffering, each loop box has associated with it sensors for indicating the amount of tape therein. In response to the sensors, the reel associated with the loop box is rotated to maintain a proper amount of tape in the box.

The systems used for so controlling the reels generally take two forms. One is commonly called the "bang-bang" technique in which the reel associated with the loop box is rotated to payout tape when a minimum amount of tape is in the loop box and made to takeup tape when a maximum amount of tape is in the loop box. This system is termed "bang-bang" since each reel constantly oscillates as it rotates first to takeup tape and then to payout tape. Obviously, the elements of this system are subject to high wear.

The other common type of reel control continually responds to variations in the amount of tape in each loop box. In one embodiment of this type, a tachometer is associated with each loop box and engaged by the tape so that the reel motors are controlled in response to the rate of tape movement as well as the maximum and minimum lengths of tape in the loop boxes. Although embodiments of this second type of control system are obviously more precise then the first and have a smoother operation, they are also more expensive.

SUMMARY OF THE INVENTION

It is the primary object of this invention to provide a reel control system for a tape transport which provides a more precise and smoother operation than the "bang-bang" system but is not as expensive as the known systems which continually respond to variations in the amount of tape in the loop boxes.

It is another object to provide such a system which is bidirectional and operates when the tape is fed from the takeup reel to the supply reel as well as from the supply to the takeup reel.

It is a further object to provide such a reel control system which maintains predetermined amounts of tape in the loop boxes when the tape is not being fed.

It is another object to provide such a reel control system which operates to feed tape into the loop boxes in response to an applied load signal when the loop boxes are empty.

It is a further object of this invention to provide an inexpensive governor control for the reel motors.

It is an additional and general object to provide a reel control system which is inexpensive yet is reliable and easy to maintain.

In accordance with the invention, supply and takeup reels in a tape transport are controlled by the amount of tape in buffers, each of which is associated with one of the reels. The supply reel is controlled in response to four predetermined amounts of tape in its associated buffer. When a first predetermined minimum amount of tape is present in its associated buffer, the supply reel motor is driven at a high level of torque to payout tape. In response to a second predetermined amount of tape occurring in the buffer where the second amount is greater than the first amount, the supply reel motor is driven at a lower torque level to pay out tape. In response to a third amount of tape greater than the second amount of tape in the buffer, the supply reel motor is allowed to freely rotate. And in response to a fourth amount of tape greater than the third amount of tape occurring in the buffer, the supply reel motor is driven at the higher torque level to takeup tape.

The takeup reel's rotation is also controlled in response to four successive amounts of tape in its associated buffer. In response to its buffer having a first and minimum amount of tape, the takeup reel motor is driven at the higher torque level to payout tape. When its associated buffer has a second predetermined amount of tape greater than the first, the takeup reel motor is allowed to rotate freely. When the takeup buffer contains a third predetermined amount of tape greater than the second, the takeup reel motor is driven at the lower torque level to takeup tape. And, when a fourth amount of tape greater than the third amount of tape is in the buffer, the takeup reel motor is driven at the higher torque level in the takeup direction.

Preferably, each buffer in a vacuum loop box is divided into four zones by three photocells. The four predetermined amounts of tape thereby correspond to the four zones within which the end of the tape loop in the box may be located.

When the tape is fed backward, the supply reel is controlled as the takeup reel and the takeup reel as the supply reel.

When the tape transport is quiescent or not feeding tape in either direction, the amount of tape in the loop boxes is controlled. Each reel is driven at the higher torque level to payout tape when the first predetermined amount of tape is sensed in its associated loop box. Similarly, each reel is allowed to rotate freely when its associated loop box has the second amount of tape. Each reel is driven at the lower torque level to takeup tape when the third amount of tape occurs in its loop box and each reel is driven at the higher torque level to takeup tape when the fourth amount of tape occurs in its associated loop box.

Further, in response to a load signal the motors payout tape into their loop boxes when they are empty.

Preferably, each reel motor is controlled by a simple circuit which utilizes the motor's back EMF to govern the motor's speed.

BRIEF DESCRIPTION OF THE DRAWING

FIG. 1 is a schematic view of a preferred embodiment of the invention.

FIG. 3 is a schematic diagram of the control circuit of one of the motors.

FIG. 4 is a tabulation illustrating the operation of the invention when feeding tape.

FIG. 5 is a tabulation illustrating the operation of the invention when not feeding tape.

DESCRIPTION OF THE PREFERRED EMBODIMENT

Figure 2:
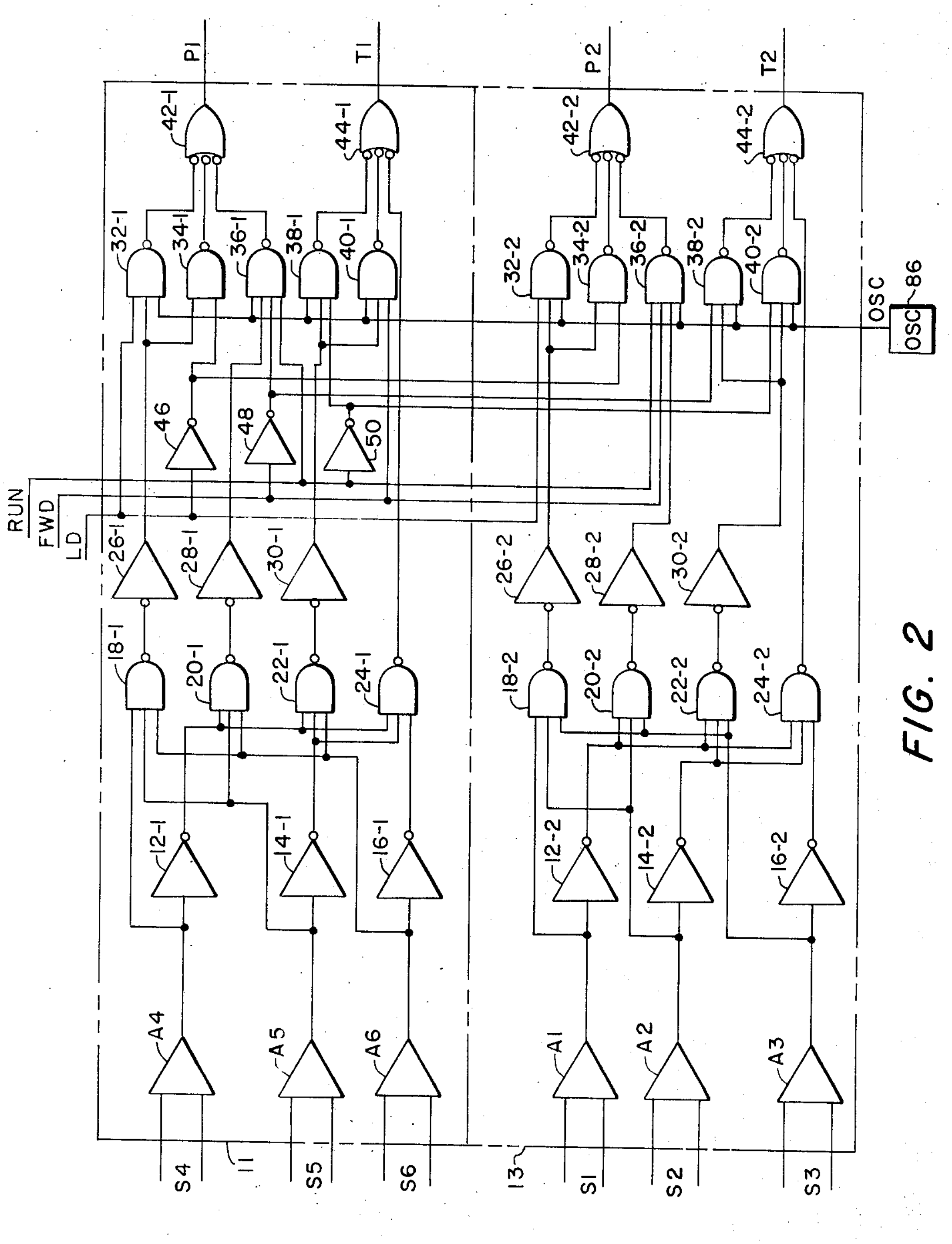
FIG. 2 is a schematic diagram of the control logic illustrated as a block in FIG. 1.

FIG. 1 illustrates a magnetic tape transport system having a supply reel R2 and a takeup reel R1. The tape is fed from the supply reel R2 to the takeup reel R1 by partially wrapping around and engaging the periphery of a rotatable capstan C. A magnetic head H is positioned somewhere along the tape's path to read and/or write data from or on the tape. A supply loop box L2 is provided between the supply reel R2 and the capstan C to buffer a loop of the tape between that reel and the capstan C. Similarly, another loop box L1 is provided between the capstan and the takeup reel R1 to buffer a loop of the tape at this location. Means, not shown, is provided with each loop box to form a vacuum within the box for drawing the loop of tape into it. The reels R1 and R2 are bidirectionally rotated by motors M1 and M2 coupled thereto respectively. When reel R1 is rotated to payout tape it is rotated in a counterclockwise direction while motor M2 rotates reel R2 in a clockwise direction to payout tape. Conversely, reel R1 is rotated clockwise to takeup tape while reel R2 is rotated counterclockwise to takeup tape. As illustrated, each loop box is divided into four zones, 1–4, by three sensors. Sensors S1, S2 and S3 are associated with loop box L2 while sensors S4, S5 and S6 are associated with loop box L1. Each sensor may be a photoelectric device which senses light from a light source (not shown) located on the opposite side of the loop box. For example, with respect to loop box L1, when the end of the tape is in zone 1, all the sensors S4, S5 and S6 will be able to receive light from the light source on the opposite side of the loop box. However, when the end of the tape is in zone 2 in loop box L1, S4 will not be able to receive light while S5 and S6 will. When the end of the tape is in zone 3, sensors S4 and S5 will be blanked out while sensor S6 will still be able to receive light. Finally, when the end of the tape is in zone 4 (as illustrated in FIG. 1) none of the sensors will be able to receive light. The sensors S1, S2 and S3 associated with loop box L2 indicate the amount of tape in that loop box in the same manner. Obviously, the location of the end of the loop in the loop boxes is directly proportional to the amount of tape located in each box.

Of course, the amount of tape indicated by the sensors is not an exact one but rather an amount which varies between minimum and maximum limits. The amount of tape in a loop box will vary somewhat while the end of the tape loop is in a particular zone. Thus, while the sensors may be considered to indicate which of four amounts of tape is in a loop box, actually the sensors are indicating the one range of four possible ones in which the amount of tape may vary. However, the variable amount of tape in each range is not directly related to the invention and the sensors will be considered to indicate amounts of tape, although in reality each indicates an amount which varies somewhat.

FIG. 1 also illustrates a box labeled LOGIC having as inputs the signals from sensors S1 through S6 as well as three additional signals from an outside source and arbitrarily designated RUN, FWD and LD. As outputs, the LOGIC has four signals: T1, P1, T2 and P2. T1 is a signal indicating that takeup reel R1 is to takeup tape while P1 is a signal indicating that reel R1 is to payout tape. T2 and P2 are similar signals relating to the supply reel R2. These signals are fed to the motors controlling the reels. Signals T1 and P1 are fed to motor M1 to control R1 and signals T2 and P2 are fed to motor M2 to control R2. The signals T1 and P1 (or T2 and P2) are mutually exclusive; that is, in each pair of T and P signals, only one is active at a time. Referring to FIG. 4, a tabulation is provided showing the manner in which the takeup reel R1 and supply reel R2 are controlled in response to the amount of tape in their respective loop boxes. Each reel R1 or R2 is independent of the amount of tape in the loop box associated with the other reel. That is, reel R2 is controlled solely in response to the amount of tape in loop box L2 and reel R1 is solely controlled in response to the amount of tape in loop box L1.

As illustrated in FIG. 4, when the tape in loop box L1 is in zone 1 so that a first predetermined amount (range) of tape is in the loop box L1, reel R1 is controlled to payout tape. Thus, the P1 signal of FIG. 1 will be active. When the end of the loop in loop box L1 is in zone 2, the reel R1 is allowed to coast or freely rotate so that neither T1 nor P1 will be active. Of course, when the end of the tape is in zone 2, a second predetermined amount of tape is in loop box L1 which is greater than the first predetermined amount of tape. When a third predetermined amount of tape, greater than the second amount of tape, is in loop box L1, according to FIG. 4, the motor M1 is intermittently (or chop) energized to drive reel R1 to takeup tape. In this case, the signal T1 from the logic of FIG. 1 will intermittently be active. Such intermittent energization of the motor produces a lower motor drive torque than does a constant level energization, the latter being employed to drive the motor in the zone 1 and 4 drive situations. Finally, when the end of the loop in loop box L1 is in zone 4 and a fourth predetermined amount of tape greater than the third amount occurs in loop box L1, the reel R1 is driven by motor M1 to takeup tape. In this case, the T1 signal from the logic block of FIG. 1 will be active.

With respect to the supply reel R2, when the end of the tape is in zone 1 and a first predetermined amount of tape is in the box L2, motor M2 is controlled to rotate reel R2 to payout tape and signal P2 from the logic block in FIG. 1 is active. When the end of the tape in loop box L2 is in zone 2 and a second predetermined amount of tape, greater than the first, occurs, the supply reel motor is intermittently energized (or chopped) to payout tape at the lower torque level. In this case, the signal P2 in FIG. 1 is intermittently active. When the end of the loop in loop box L2 is in the third zone and a third predetermined amount of tape greater than the second amount occurs in loop box L2, the reel is allowed to freely rotate (or coast) so that neither T2 nor P2 are active in FIG. 1. When a fourth predetermined amount of tape greater than the third occurs in loop box L2 and the end of the tape is in zone 4, the supply reel R2 is rotated at the higher torque level to takeup tape and signal T2 in FIG. 1 is active.

The block designated as LOGIC in FIG. 1 contains elements which operate in the conventional manner on a binary voltage level basis wherein the inputs to the elements and the outputs therefrom always exist at either of two discrete voltage levels, the higher level or the lower level of the system utilized. The P and T outputs are high when active.

FIG. 3 shows the electrical circuit which directly drives the motor M1 which controls reel R1 in response to the outputs of T1 and P1 from the control logic. The comparable circuit for driving motor M2 in response to the outputs T2 and P2 is similar and thus will not be described.

In FIG. 3, the T1 signal is initially fed to the positive input of an operational amplifier 2 while the signal P1 is initially fed to the amplifier's negative input. As above noted, the signals T1 and P1 are mutually exclusive and are at a high voltage when active. Since the signals T1 and P1 are logic signals and since the signals used in conventional logic systems are not sufficient voltage levels to be utilized by outside elements, these signals are amplified by the operational amplifier 2. When receiving a high T1 signal, the operational amplifier provides at its output a positive voltage of greater magnitude than the initially received T1 high signal. Similarly, in response to receiving a high P1 signal the amplifier provides a negative voltage at a lower negative level than is generally used in logic systems. The output in response to the T1 signal is positive while that in response to the P1 signal is negative since the signals are applied to the positive and negative inputs of the amplifier respectively.

The output of amplifier 2 is fed to a summing amplifier schematically indicated as 4. The summing amplifier includes an operational amplifier 5 which receives the signals from operational amplifier 2 at its negative input and has its positive input connected to ground. The outputs from the summing amplifier 4 are inverted with a positive signal from amplifier 2 being converted to a negative signal and a negative signal from amplifier 2 being converted to a positive signal. Thus, at this location in the circuit, a signal to drive the motor so that reel R1 is rotated to takeup tape is a negative pulse while a signal requiring R1 to payout tape takes the form of a positive pulse.

The signals are then fed to a non-inverting power amplifier 6 which in response provides sufficient current to drive the motor M1. The motor M1 is bidirectional and drives the reel R1 in a direction to takeup tape (clockwise in FIG. 1) in response to a negative input. In response to a positive input, the motor M1 drives reel R1 so that reel R1 paysout tape (that is, rotates counterclockwise in FIG. 1). Preferably, the motor is of the permanent magnet shunt variety.

Power amplifier 6, as shown, includes a conventional current gain amplifier 6*a* as well as a voltage divide network (comprising resistors R4 and R5) and an inverter 6*b* arranged in a feedback loop. The output of the feedback loop at inverter 6*b* limits the output of the power amplifier 6 and thus serves to dampen the motor's response so that excessive reel oscillation is avoided.

As shown in FIG. 3, the motor is connected within a conventional voltage divider bridge comprising resistors R6, R7 and R3. One leg of the bridge is made up of resistors R3 and R6 while the other leg of the bridge comprises the armature of the motor M1 and the resistor R7. A lead 7 is connected at the junction of resistors R3 and R6 while another lead 9 is connected between the armature of motor M1 and resistor R7. A differential amplifier 8 is also provided with lead 9 connected to its negative input and lead 7 connected to its positive input. The output of differential amplifier 8 is connected back via lead 10 to the summing amplifier 4 in a feedback loop. This feedback loop serves to govern the maximum speed which motor M1 is to be driven by utilizing the back EMF generated by the motor. The feedback voltage produced by differential amplifier 8 in lead 10 will be proportional to the drop in potential across resistor R6 minus the drop in potential across resistor R7. With this feedback voltage applied to the summing amplifier 4, the output of the summing amplifier will be the input voltage from amplifier 2 minus the feedback voltage on lead 10. The feedback voltage will increase as the motor accelerates and, thereby, act as a governing influence on the voltage applied to the motor M1 through amplifier 6.

In discussing FIGS. 1 and 4 above, it was noted that for particular situations the signals T1 and P1 are applied intermittently. With this situation, the input to the circuit of FIG. 3 (or to the similar one for the supply reel R2) is merely a train of discrete high pulses applied to the proper input of amplifier 2. In response, the circuit intermittently acts in a manner similar to that described for a constant active signal (T or P) input. As described above, the motor responds to the pulsed input to produce a lower drive torque than is produced in response to the constant input. In both cases, however, rotation of the motor output shaft is continuous.

When no signal is applied to the operational amplifier 2, no driving current is applied to the motor. Thus, in this situation, the reel is not driven but allowed to freely rotate. Of course, the reel is still subject to friction forces, inertia and other inherent factors.

FIG. 2 illustrates in detail the control logic circuit for the tape transport illustrated as a block in FIG. 1. As shown, the circuit comprises two subcircuits 11 and 13 which are essentially independent of each other. The circuit 11 provides outputs P1 and T1 to control the takeup reel in response to inputs from sensors S4, S5 and S6. Similarly, the subcircuit 13 provides outputs P2 and T2 to control the supply reel R2 in response to inputs from sensors S1, S2 and S3. However, the input signals RUN, FWD AND LD operate on elements in each of the subcircuits. The OSC signal from free running oscillator 86 merely comprises a continual train of high square-wave pulses.

The signal RUN is applied from the outside source as a continuous high signal when the machine is in its operative rather than its quiescent state. That is, a high RUN signal is present when the machine is operating. The quiescent state of the machine and the operation of the logic circuits during such state will be described subsequently.

The FWD signal is applied as a continuous high while the machine is operating in its forward mode with the capstan C in FIG. 1 rotating counterclockwise and moving tape from the supply reel R2 to the takeup reel R1. When the FWD signal is low rather than high, the machine operates in its backward mode so that the capstan reverses itself and rotates clockwise to move tape from the takeup reel R1 to the supply reel R2.

The signal LD is a high signal of predetermined duration which is applied to the logic circuit from an outside source when a reel having a new supply of tape has been loaded in the transport and the loop boxes L1 and L2 do not contain tape.

As illustrated in FIG. 2, the elements making up subcircuit 11 are essentially the same elements as those making up subcircuit 13. Reference numerals have been applied to the elements in the subcircuits so that corresponding elements in the subcircuits have the same reference numerals although those elements in subcircuit 11 relating to the takeup reel R1 have a 1 after their reference numeral while those in subcircuit 13 relating to the supply reel R2 have a 2 after each reference numeral.

Each sensor (FIG. 1) S1–S6, upon receiving light, provides an active signal to a corresponding amplifier A1–A6 in FIG. 2. Subcircuit 13 contains amplifiers A1–A3 and subcircuit 11 contains A4–A6. Each amplifier provides a high output in response to an active signal from its corresponding sensor. Each subcircuit (11, 13) also contains three inverters 12, 14, and 16, each of which provide a low ouput in response to a high signal applied to its input. Further, each of the subcircuits 11 and 13 contain four NAND gates 18, 20, 22 and 24. Each of these NAND gates provide a low output voltage only when all of its input lines exist at the high level. Three additional inverters, 26, 28 and 30 are also provided in each subcircuit. These inverters operate to provide a high output when the input signal applied to it is low. Each subcircuit additionally contains five NAND gates, 32, 34, 36, 38, and 40. Each NAND gate operates, as those designated 18–24, to provide a low output voltage only when all input lines exist at the high level. Finally, each subcircuit also contains a pair of NOR gates, 42 and 44. Each NOR gate operates to provide a high output voltage when any one or more of its input lines is at the low voltage. The outputs of NOR gates 42-1 and 42-2 provide the outputs P1 and P2 respectively. NOR gates 44-1 and 44-2 provide the signals T1 and T2 respectively.

Amplifiers A1 and A4 each provide its output to a NAND gate 18 and an inverter 12. Amplifiers A2 and A5 each provide an output to two NAND gates 18 and 20 as well as to an inverter 14. Amplifiers A3 and A6 each provide an output to three NANDS 18, 20 and 22 as well as to an inverter 16.

Each inverter 12 provides its output to three NANDS 20, 22 and 24. Each inverter 14 provides its output to two NANDS 22 and 24. Each inverter 16 provides its output to a NAND 24.

NANDS 18, 20 and 22 provide their outputs to inverters 26, 28 and 30 respectively. Each NAND 24 provides its output to a NOR 44.

Each NAND 32 has as its input the LD and OSC signals as well as a signal from an inverter 26 and provides its output to a NOR 42. Each NAND 34 receives the output from an inverter 26 and the LD signal and provides its output to a NOR 42. Each NAND 36 also feeds its output to a NOR 42 and receives the RUN, FWD and OSC signals as well as the output from an inverter 28 as its inputs. Each NAND 38 feeds its output to a NOR 44 and receives the OSC and FWD signals as inputs as well as the output from an inverter 30. Each NAND 40 also feeds its output to a NOR 44 and receives as its inputs the RUN, OSC and the output from an inverter 30.

Figure 6:
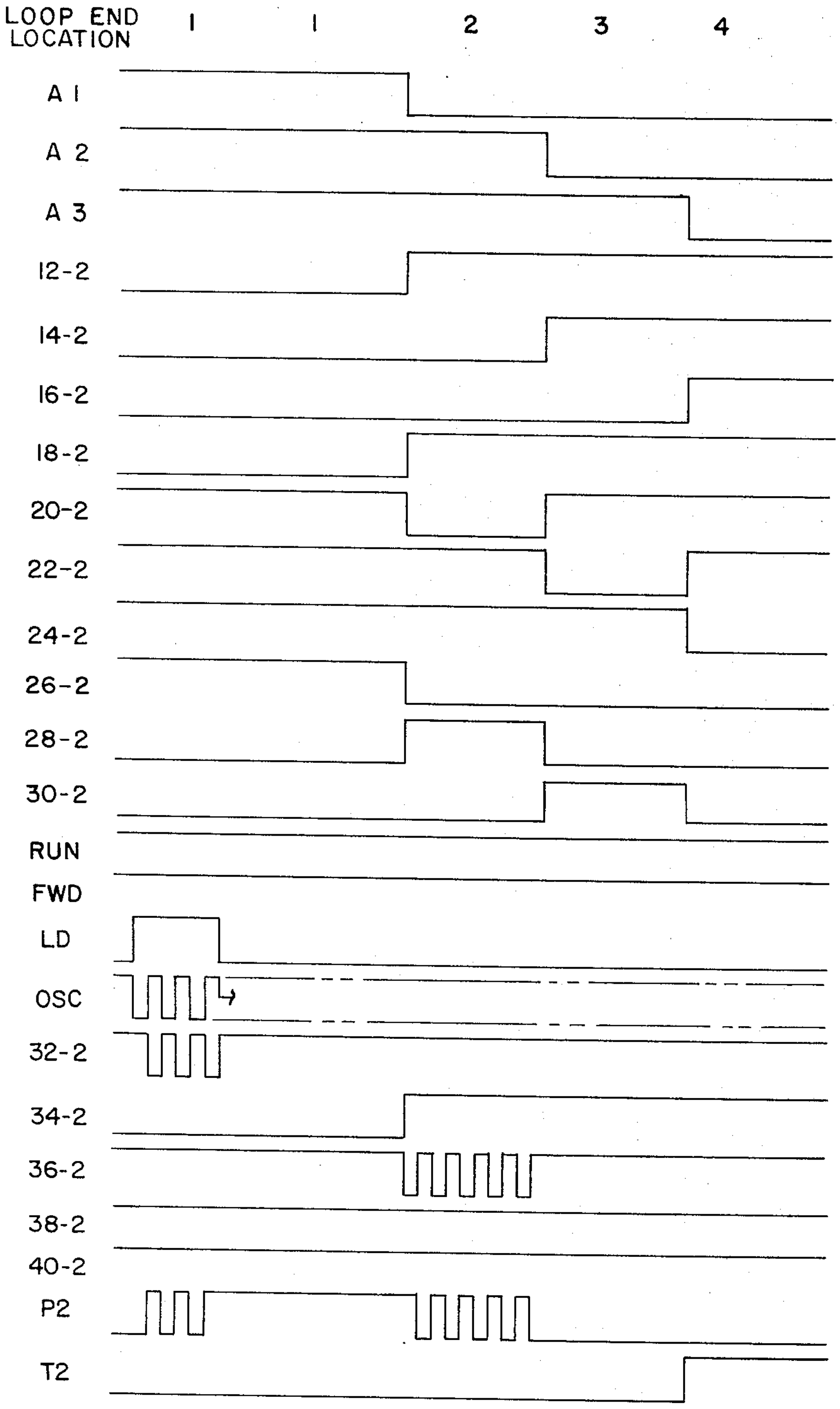
FIGS. 6, 6*a* and 6*b* are waveform diagrams illustrating the operation of that portion of the logic control circuit shown in FIG. 2 relating to the supply reel.
Figure 7:
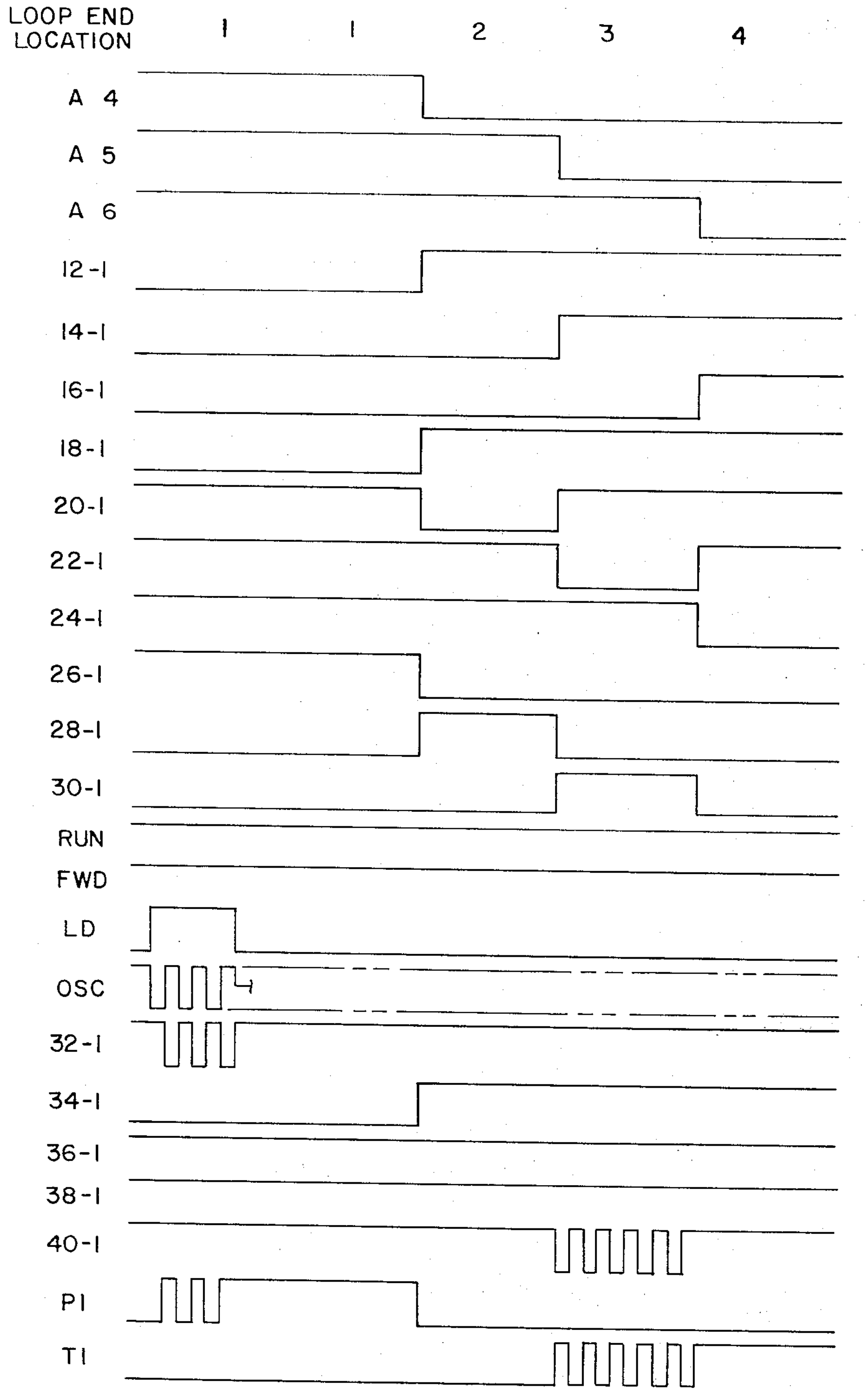
FIGS. 7, 7*a* and 7*b* are waveform diagrams illustrating the operation of that portion of the logic control circuit illustrated in FIG. 2 relating to the takeup reel.

FIG. 6 is a waveform diagram illustrating the operation of the elements in subcircuit 13 in FIG. 2 for the four different amounts of tape that may occur in loop box L2. Similarly, FIG. 7 is a waveform diagram illustrating the operation of the elements in subcircuit 11 of FIG. 2 for the four different amounts of tape which are sensed in loop box L1. FIGS. 6 and 7 also illustrate the operation of these circuit elements in response to the application of an LD signal which generally occurs when initially installing a new supply reel having a fresh supply of tape. To install the tape, the supply reel is placed in position and the free end of the tape wrapped several times around the takeup reel. Of course, no tape appears then in loop boxes L1 and L2 so that the logic circuit operates to require motors M1 and M2 to rotate reels R1 and R2 to payout tape in response to the LD signal.

In this initial condition, none of the sensors in either of the loop boxes sense the presence of tape adjacent them so that amplifiers A1 through A6 provide high signals. Inverters 12, 14 and 16 in both of the subcircuits 11 and 13 thereby provide low signals. Each NAND gate 18 responding to high inputs from the amplifiers provide a low output while NANDS 20, 22 and 24 are held high by the low outputs from inverters 12, 14 and 16. Inverters 26 provide high signals at their outputs in response to the low output from NANDS 18 but inverters 28 and 30 provide low outputs because of the high signals applied at their inputs from NANDS 20 and 22 respectively.

Inverters 26, 28 and 30 operate on NANDS 32, 34, 36, 38 and 40 which are also responsive to the signals LD, RUN, FWD and OSC. The waveform diagrams of FIGS. 6 and 7 assume that the RUN signal is high because the machine is to be operated and the FWD signal is also high because it is desired to move tape from the supply reel R2 to the takeup reel R1. Of course, the running oscillator 86 continually provides the OSC signal.

Both NANDS 32 provide an oscillating output as they receive the high LD signals, the high outputs of inverters 26, and the oscillating OSC signal. These NANDS 32 feed their oscillating outputs to the NORS 42-1 and 42-2 which thereby pass oscillating output signals P1 and P2, respectively, to cause the reel drive motors to apply the lower drive torque to both the takeup and supply reels to payout tape. As shown in the waveform diagrams of FIGS. 6 and 7, these oscillating payout signals occur for as long as the high LD signal is applied to the logic circuit. In this manner, when a new supply of tape is initially mounted on the transport, the reels are made to payout tape into their associated loop boxes by the LD signal.

During the application of the LD signal, none of the other NAND gates 34, 36, 38 or 40 operate to apply a low output at any of the NOR gates 42, 44. NAND gates 34 are blocked from providing a low output since the high LD signal is converted to a low signal by inverter 46 whose output is connected to an input of each of the NANDS 34. The outputs of NANDS 36, 38 and 40 are maintained high by the application of the low outputs of inverters 28 and 30. NANDS 24 both provide high signals which, when applied to NORS 44, do not provide high T1 or T2 signals.

It should be noted from FIG. 2 that the LD signal acts only through NANDS 32-1 and 32-2 to cause the reels to rotate in the payout direction. NAND 32-1 can only provide an oscillating output in response to the LD signal (and the OSC signal) when the output of inverter 26-1 is high. As shown in FIG. 7, this occurs only when the end of the tape loop in box L1 is in zone 1. Similarly, NAND 32-2 can only provide an oscillating output in response to the LD signal (and also the OSC signal) when the output of inverter 26-2 is high and, as shown in FIG. 6, this only occurs when the end of the loop in box L2 is in zone 1. Therefore, the LD signal is only effective before the tape loops reach zone 2 of the loop boxes (and sensors S5, S2 in FIG. 1). When zone 2 is reached and thus a certain amount of tape is sensed in the box, the LD signal is overridden. This thereby automatically shuts off the payout effected by the LD signal since a suitable amount of tape has now been received by the loop boxes.

The remaining portions of the waveforms shown in FIGS. 6 and 7 show the outputs of the circuit elements for high RUN and FWD signals with a low LD signal and the usual OSC signal applied. The waveforms show these outputs as they occur in response to the ends of the loops in loop boxes L1 and L2 occurring in the various zones, 1 through 4.

As shown in FIG. 7, when the end of the tape in loop box L1 is in zone 1, a high P1 signal is provided along with a low T1 signal to cause the takeup reel R1 to rotate to payout tape. FIG. 7 also illustrates that when the end of the tape in loop box L1 is in zone 2, neither the P1 nor the T1 signal is high so that the reel R1 is not driven in either direction but is allowed to freely rotate. Of course, when the end of the loop is in zone 1 of loop box L1 sensors S5 and S6 are active while sensor S4 is not active so that A5 and A6 but not A4 provide positive signals.

When the end of the tape in loop box L1 is in zone 3, sensors S4 and S5 are not active but sensor S6 is so that only A6 provides a high output. In response to this, the remainder of subcircuit 11 causes a low signal to appear at the P1 output and an oscillating high signal to appear at the output designated T1.

When the loop of tape is in zone 4 of loop box L1, all of the sensors, S4–S6, are inactive so that none of the amplifiers in subcircuit 11 provide high outputs. In response to this condition, a low P1 signal and a high T1 signal are provided. This causes the takeup reel R1 to rotate to takeup the tape.

With respect to loop box L2, subcircuit 11 in FIG. 2 and the supply reel R2, amplifiers A1, A2 and A3 provide their outputs in response to the zone in which the end of the tape is located in a manner similar to that with respect to loop box L1. As shown in FIG. 6, when the tape is in zone 1 of loop box L2, the P2 signal is high and the T2 signal low requiring the reel to rotate to payout the tape. When the end of the tape is in zone 3, both the T2 and P2 signals are low allowing the reel to rotate freely. When the end of the tape in loop box L2 is in zone 2, the T2 signal is low but the P2 signal is oscillating so that the reel is driven at low torque to payout the tape. When the end of the tape is in zone 4 of loop box L2, a positive T2 signal and a negative P2 signal are provided causing the supply reel R2 to be driven at high torque to takeup the tape.

Thus, the logic control circuit of FIG. 2 causes the reels to rotate as called for in FIG. 4 in response to the amounts of tape in the loop boxes. Each reel motor is energized intermittently for low torque operation and allowed to coast as well as being driven at the constant high torque level to payout and takeup tape. This system is obviously more precise, smoother and more sophisticated than the known "bang-bang" method of reel control. However, the invention is not as expensive as systems which continually vary the rotation of the reels in response to continual variations in the amount of tape in the loop boxes. The invention lies between these two systems and provides an inexpensive reel control system with adequate precision.

As a further example, the operation of the elements in FIG. 2 will be illustrated for the situation where the ends of both tape loops are in zone 2 of loop boxes L1 and L2. With this example, normal operation is assumed with a low LD signal and high RUN and FWD signals. Only sensors S5, S6, S2 and S3 will be active. Thus as shown in FIGS. 6 and 7, amplifiers A5, A6 in subcircuit 11 and A2, A3 in subcircuit 13 will provide high outputs. Inverters 12 will have high outputs with inverters 14 and 16 having low outputs. These inverters and amplifiers cause NANDS 18, 22 and 24 to provide high outputs while NANDS 20 provide low outputs. Thus, inverters 28 have high outputs while inverters 26 and 30 have low ones. The low outputs of inverters 26 and 30 prevent NANDS 32, 34, 38 and 40 from providing lows to the NORS 42 and 44. Both NANDS 36 receive high signals from inverters 28. NAND 36-1 in subcircuit 11, however, cannot provide a low output to NOR 42-1 since it receives (via inverter 48) the inverted FWD signal as a low. Thus neither 42-1 nor 44-1 in subcircuit 11 provide a high signal so that both P1 and T1 are low. With respect to subcircuit 13, NAND 36-2 receives the FWD and RUN signals directly as high inputs and thus, with a high output from inverter 28-2 and an oscillating train of OSC high pulses, will provide an oscillating output to NOR 42-2 so that P2 is a train of high pulses. Since NOR 44-2 does not receive a high input, T2 is low. Thus, with neither P1 nor T1 high the takeup reel is allowed to freely rotate. With a low T2 and oscillating P2, the supply reel motor is pulsed to apply a low torque payout drive to the reel.

As previously mentioned, the tape transport of the invention may operate to move the tape bidirectionally. That is, the transport may move the tape in a backward mode from the takeup to the supply reel as well as in the usual forward mode from the supply to the takeup reel. When the backward move occurs, the capstan C in FIG. 1 is rotated clockwise and the FWD signal is low rather than high indicating that the tape is to be driven backward. As illustrated in FIG. 2, the only elements whose outputs are dependent on the state of the FWD signal are NANDS 40-1 and 36-2 which directly receive the FWD signal and NANDS 36-1 and 38-2 which receive an inverted FWD signal. FIGS. **6*b* and 7*b* illustrate the operation of the relevant circuit elements with a low FWD signal in response to the various four tape loop end locations. The first two NANDS in response to the negative FWD signals provide high rather than the low outputs that are necessary to cause NORS 44-1 and 42-2 to provide high signals. NANDS 36-1 and 38-2 receive an inverted version of the FWD signal from inverter 48. When FWD is negative, positive signals are thus applied to these two NANDS. NAND 36-1 in subcircuit 11 provides a low output in response to this negative signal when the RUN signal is high and a high signal occurs at the output of inverter 28-1. However, this output will oscillate because of the OSC signal which is also applied to NAND 36-1. Similarly, NAND 38-2 in subcircuit 13 provides an oscillating output in response to the low FWD signal when the output of inverter 30-2** is high.

As previously noted, when the FWD signal is negative, the tape is being run backwards from the takeup reel R1 to the supply reel R2. Upon a comparison of FIG. 6 with FIG. 7*b* it is apparent that the output P2 occurring in response to the particular tape locations in loop box L2 with a high FWD signal corresponds to the P1 output in response to the tape positions in loop box L1 with a low FWD signal. Correspondingly, upon a comparison of FIG. 6*b* with FIG. 7, the output P2 with a low FWD signal corresponds to the output P1 with a high FWD signal. Similar relationships exist between the T2 signal in FIG. 6 and the T1 signal in FIG. 7*b* and between the T2 signal in FIG. b*b* and the T1 signal in FIG. 7. Thus, when the tape is driven backwardly the supply reel R2 is in actuality controlled as the takeup reel R1 in response to tape in loop box L2 and the takeup reel R1 is controlled in response to tape in box L1 in exactly the same manner as the supply reel R2 is normally controlled. At this time the takeup reel is acting as the supply reel and the supply reel is in effect the takeup reel.

FIG. 5 is a tabulation similar to the tabulation of FIG. 4 which illustrates the manner in which the rotation of the supply and takeup reels is controlled when the tape transport is in a non-operating or quiescent condition. In this situation, the capstan C is not rotated. As shown from FIG. 5, both the supply and takeout reels are rotated in identical manners in response to the location of the end of the tape loop in their respective loop boxes. Both reels are rotated to payout tape when the end of the tape loop is in zone 1 where the minimum amount of tape is in the loop boxes. At the other extreme, when the end of either loop is in zone 4 of a loop box, the associated reel is rotated to takeup the tape. Intermediate the two extreme zones, when the end of the tape loop is in zone 2 the proper reel is allowed to rotate freely. Further, when the end of the tape loop is in zone 3, the appropriate reel is driven in the low torque mode to takeup the tape. With such a procedure, each loop of tape is controlled so that its end is approximately held somewhere at zone 2 of its associated loop box. When the end of a loop of tape is in zone 1 the appropriate reel is rotated to payout tape while when the end of the loop is in zone 3 the reel is rotated to takeup tape. Thus, with the invention, the amount of tape in the loop boxes cannot exceed to much or too little and the end of each loop is held at a suitable position.

A command for the quiescent condition is communicated to the logic control by a low rather than a high RUN signal. Referring to FIG. 2, it is seen that NANDS 36-1, 38-1, 36-2 and 40-2 (and therefore all the four NORS) are the only elements which are responsive to the RUN signals.

Figure 7A:
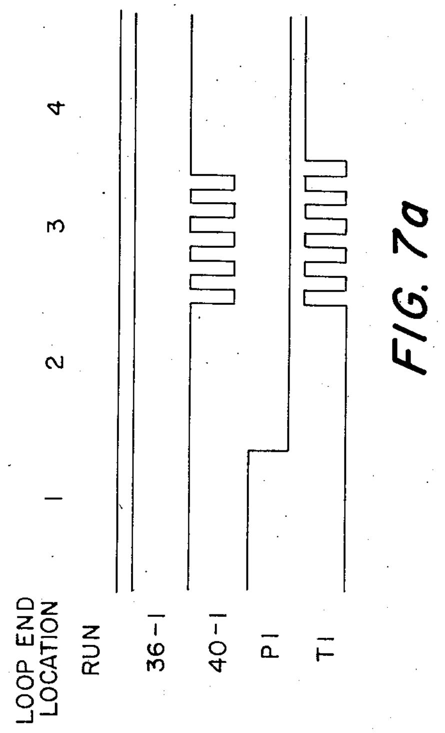
Figure 7B:
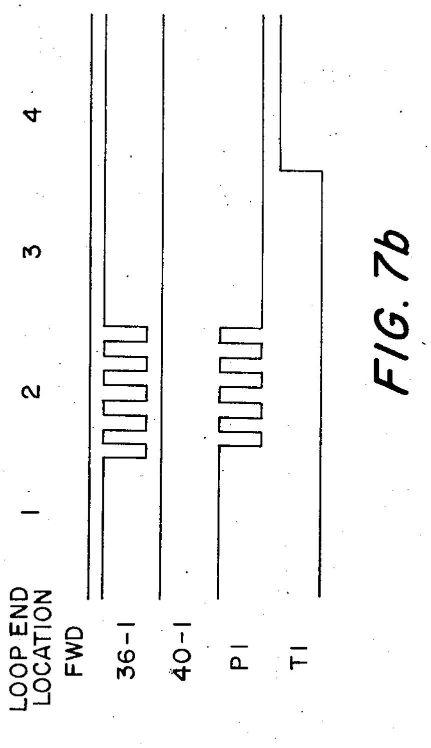
Figure 6A:
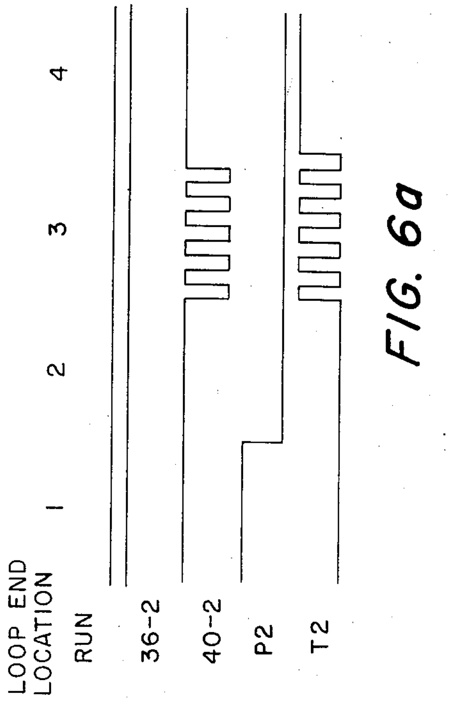
Figure 6B:
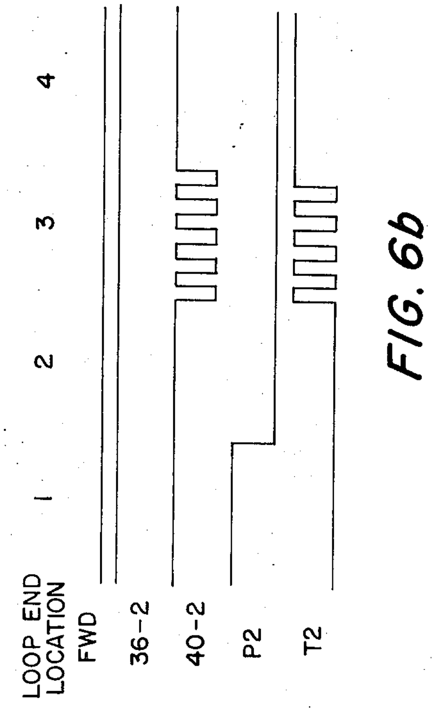

FIG. 6*a* shows waveforms of those elements in subcircuit 13 which are effected when a low rather than high RUN signal is applied. FIG. 7*a*, similarly, shows the waveforms of those elements in subcircuit 11 of FIG. 2 which change in response to a low rather than a high RUN signal. Those elements not indicated in FIGS. 6*a* and 7*a* have waveforms as shown in FIGS. 6 and 7 regardless of the type of RUN signal. FIG. 6*a* illustrates that the signals P2 and T2 are suitable for operating the supply reel in the manner called for in FIG. 5. Signals P1 and T1 as shown in FIG. 7*a* are related to the takeup reel and operate to control this reel in the manner called for in FIG. 5. Thus, the appropriate outputs P1, T1, P2 and T2, are provided from the output of the logic circuit to control the tape when the transport is in a quiescent direction so that each loop of tape is maintained in substantially a predetermined position within its encompassing loop box.

It will be appreciated that there are changes in the form and details of the above-described preferred embodiment and may be effected by persons of ordinary skill without departing from the true spirit and scope of the invention.

We claim:

1. In a tape winding system employing a reel of tape, a drive motor for rotating the reel in either a first direction to pay out tape or a second direction to take up tape, tape feeding means for feeding tape to or from said reel and tape buffering means for buffering the tape between said reel and said tape feeding means, the combination comprising:

sensing means included in said buffering means for sensing the amount of tape contained in said buffering means and for generating a first set of control signals indicative of a first amount of buffered tape, a second set of control signals indicative of a second amount of buffered tape greater than said first amount, a third set of control signals indicative of a third amount of buffered tape less than said first amount and a fourth set of control signals indicative of a fourth amount of buffered tape greater than said second amount;

means for generating a first direction signal when said tape feeding means feeds tape to said reel and a second direction signal when said tape feeding means feeds tape away from said reel;

motor control means responsive to said control signals and said direction signals for operating said drive motor, said motor control means being operable under control of said first direction signal to de-energize said motor in response to said first set of control signals and to energize said motor at a predetermined torque level to rotate said reel in said second direction in response to said second set of control signals, said motor control means being further operable under control of said second direction signal to de-energize said motor in response to said second set of control signals and to energize said motor at said predetermined torque level to rotate said reel in said first direction in response to said first set of control signals, and said motor control means being further operable under control of either said first or said second direction signal to energize said motor at a second torque level greater than said predetermined torque level to rotate said reel in said first direction in response to said third set of control signals and to energize said motor at said second torque level to rotate said reel in said second direction in response to said fourth set of control signals.

2. The tape winding system set forth in claim 1 wherein said motor control means includes means for supplying a train of periodic input pulses to said drive motor to energize it at said predetermined torque level.

3. The tape winding system set forth in claim 2 wherein said motor control means includes means for supplying a constant level, continuous input signal to said drive motor to energize it at said second torque level.

4. In a tape winding system employing a reel of tape, a drive motor for rotating the reel in either a takeup direction to take up tape or a payout direction to pay out tape, tape feeding means for feeding tape to or from said reel and tape buffering means containing a loop of slack tape between said reel and said tape feeding means, the combination comprising:

sensing means for establishing at least two zones in said buffering means contiguous with and on either side of a reference point, said sensing means being adapted to generate control signals indicative of the zone in which the bight of said tape loop resides;

means for generating a first direction signal when said tape feeding means feeds tape to said reel and a second direction signal when said tape feeding means feeds tape away from said reel; and motor control means responsive to said direction signals and said control signals for operating said drive motor, said motor control means being adapted to energize said motor when said bight resides in a first of said zones and to de-energize said motor when said bight resides in the second of said zones, the rotational direction of the torque applied by said motor during energization and the zone in which energization occurs being respectively alternated each time one of said direction signals is initiated such that energization of said motor always applies a torque to said reel tending to move said bight into the opposite of said two zones.

5. The tape winding system set forth in claim 4 further comprising:

means included in said sensing means for establishing third and fourth zones positioned respectively adjacent said first and second zones on sides thereof away from said reference position, said sensing means further being adapted to generate control signals indicative of the presence of said bight in said third and fourth zones; and means included in said motor control means operative in response to said control signals, regardless of the direction in which said feeding means feeds said tape, for energizing said motor when said bight resides in either of said third or said fourth zones to apply a torque to said reel in a direction tending to move said bight toward said reference position.

6. The tape winding system set forth in claim 5 wherein said motor control means includes means for energizing said motor such that the torque applied to said reel when said bight resides in said third or fourth zones is higher than the torque applied when said bight resides in said first or second zones.

7. The tape winding system set forth in claim 6 wherein said drive motor comprises a D.C. motor and wherein said motor control means includes means for energizing said motor with a continuous D.C. input signal to achieve said higher torque drive and means for interrupting said input signal at regular periodic intervals to achieve said lower torque drive.

* * * * *